(12) United States Patent
Greborio et al.

(10) Patent No.: US 10,467,531 B2
(45) Date of Patent: Nov. 5, 2019

(54) SERVER-MANAGED, TRIGGERED DEVICE ACTIONS

(71) Applicant: Microsoft Technology Licensing, LLC, Redmond, WA (US)

(72) Inventors: Pierre P. N. Greborio, Sunnyvale, CA (US); Yogananda Rao, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 786 days.

(21) Appl. No.: 13/920,155

(22) Filed: Jun. 18, 2013

(65) Prior Publication Data

US 2014/0372359 A1    Dec. 18, 2014

(51) Int. Cl.
G06F 17/00        (2019.01)
G06N 5/02         (2006.01)
H04M 1/725        (2006.01)

(52) U.S. Cl.
CPC .......... G06N 5/02 (2013.01); H04M 1/72569 (2013.01); H04M 1/72572 (2013.01); H04M 2250/12 (2013.01)

(58) Field of Classification Search
None
See application file for complete search history.

(56) References Cited

U.S. PATENT DOCUMENTS

| 7,616,129 | B2 | 11/2009 | Thacher |
| 7,710,824 | B1 * | 5/2010 | Katzer ..................... G01S 5/18 367/99 |
| 8,386,929 | B2 | 2/2013 | Zaika et al. |
| 2002/0019815 | A1 | 2/2002 | Branson et al. |
| 2006/0063518 | A1 * | 3/2006 | Paddon et al. ................ 455/418 |
| 2007/0300225 | A1 | 12/2007 | Macbeth et al. |
| 2010/0227605 | A1 * | 9/2010 | Fournier ............... H04L 63/123 455/419 |
| 2010/0317371 | A1 | 12/2010 | Westerinen et al. |

(Continued)

OTHER PUBLICATIONS

Chen, et al., "Logging and Analyzing Mobile User Behaviors", In International Symposium on Cyber Behavior, Feb. 10, 2012, 15 pages, http://www3.nccu.edu.tw/~li/Publication/pdf/cb2012.pdf.

(Continued)

*Primary Examiner* — Luis A Sitiriche

(57) ABSTRACT

In some scenarios, devices may execute applications that are configured to monitor a set of conditions (e.g., geographic coordinates detected by global positioning system (GPS) receivers), and to execute actions upon detecting the fulfillment of the conditions. However, in such architectures, each application may be responsible for polling the sensors of the device to detect condition fulfillment, and it may be difficult to specify rules in a hardware-independent manner involving multiple applications and/or devices. Presented herein are techniques for configuring devices to perform actions by receiving a rule set from a rule server; registering a set of condition tests for respective conditions of a rule with the sensors of the device; upon being notified by the sensor that a condition test has been fulfilled, evaluating the conditions of the rule; and upon determining a fulfillment of the conditions, executing one or more actions (optionally involving multiple devices and/or applications).

21 Claims, 9 Drawing Sheets

(56) References Cited

U.S. PATENT DOCUMENTS

2012/0011233 A1* 1/2012 Dixon et al. ................ 709/221
2012/0158161 A1* 6/2012 Cohn et al. .................. 700/90
2012/0240183 A1   9/2012 Sinha
2013/0031159 A1   1/2013 Xiao et al.
2013/0031191 A1   1/2013 Bott

OTHER PUBLICATIONS

"International Search Report and Written Opinion issued in PCT Patent Application No. PCT/US2014/042214", dated Jun. 25, 2015, 6 Pages.
Chinese Office Action in Application 201480035001.8, dated Feb. 23, 2017, 10 pages.
European Extended Search Report in Application 14737424.3, dated May 12, 2017, 8 pages.
Chinese Office Action in Application 201480035001.8, dated Nov. 30, 2017, 7 pages.
"Third Office Action issued in Chinese Patent Application No. 201480035001.8", dated Jun. 5, 2018, 7 Pages.
"Office Action Issued in European Patent Application No. 14737424.3", dated Jul. 25, 2018, 6 Pages.

* cited by examiner

SERVER-MANAGED, TRIGGERED DEVICE ACTIONS

BACKGROUND

Within the field of computing, many scenarios involve a device executing one or more actions in response to a set of conditions. As a first example, the conditions may involve user input received from a user specifying a request to perform an action. As a second example, the conditions may involve an application configured to monitor a context of the device to detect a current context of the device, and then perform an action upon detecting that the current context of the device matches a condition associated with the action. For example, in a geofencing scenario, an application executing on the device may periodically poll a global positioning system (GPS) receiver for a current set of coordinates, compare the coordinates to a predefined area of interest, and upon detecting during such polling that the device has entered the area of interest, may perform one or more actions. As a third example, the conditions may involve other data sources, such as the receipt of email messages in an email box, or a completion of a task in a cloud service.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In many devices, the architecture for responding to conditions may involve enabling respective applications to poll for the fulfillment of a condition, and to respond upon being notified of the fulfillment of the condition. However, such architectures may be limited in various respects. As a first such example, techniques based on polling a device to detect the fulfillment of a set of conditions may inefficiently utilize the processor (e.g., running a background thread that frequently polls the sensors of the device), memory (e.g., maintaining a thread and associated resources to perform the polling), and/or power (e.g., the use of the processor and/or memory to perform polling may steadily drain the battery power of a portable device). Such problems may be exacerbated if such polling is performed by a variety of applications, each polling the sensors of the device to detect fulfillment of the conditions pertinent to that application. As a second such example, for architectures that are driven by the conditions and actions specified by a particular application, it may be difficult to extend this architecture to the operation of multiple applications (e.g., a first application that performs the monitoring of a condition and a second application that executes an action when the condition is fulfilled; an action to be executed when a first sensor or application detects the fulfillment of a first condition, and a second sensor or application detects the fulfillment of a second condition; or the monitoring of a condition by a first device of a user, and the execution of actions on a second device of the user). As a third such example, it may be difficult to specify the conditions in a higher-level manner. For example, an application may be configured to communicate with a global positioning system (GPS) receiver to detect the arrival of the device at a particular area, but may be unable to execute on devices lacking a GPS receiver but having a different location mechanism, such as a WiFi adapter configured to triangulate a location from nearby WiFi signals. Accordingly, it may be desirable to specify the conditions in a hardware-independent manner—e.g., a condition that is fulfilled whenever the device is detected in a particular location, irrespective of the location detection hardware and mechanisms involved—but the device may provide limited support for evaluating conditions specified in a high-level manner.

Presented herein are techniques for configuring a device to respond to the fulfillment of conditions in a manner that may facilitate the efficiency and/or robustness of the fulfillment. In accordance with these techniques, a rule server may provide a rule set to one or more devices, where respective rules of the rule set specify one or more conditions; one or more condition tests whereby one or more conditions are determined to have been fulfilled; and one or more actions to be executed upon fulfillment of the condition tests of the conditions. In such techniques, the specified conditions may be specified at a comparatively hardware-independent level (e.g., "detect when the user arrives at an airport"), while the condition tests may specify the manner of determining the fulfillment of the condition based on the sensors accessible to the device (e.g., "determine whether the coordinates reported by a global positioning system (GPS) receiver are within a defined area"). Respective devices may receive and store the rule set, and may register the respective condition tests with one or more sensors of the device. When the sensor notifies the device that a condition test has been satisfied, the device may evaluate the rule to determine whether the set of conditions has been satisfied, and, if so, may execute the actions of the rule. In this manner, the rule server and the devices may interoperate to achieve the configuration of the devices to perform actions upon the fulfillment of the rules of the rule set in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
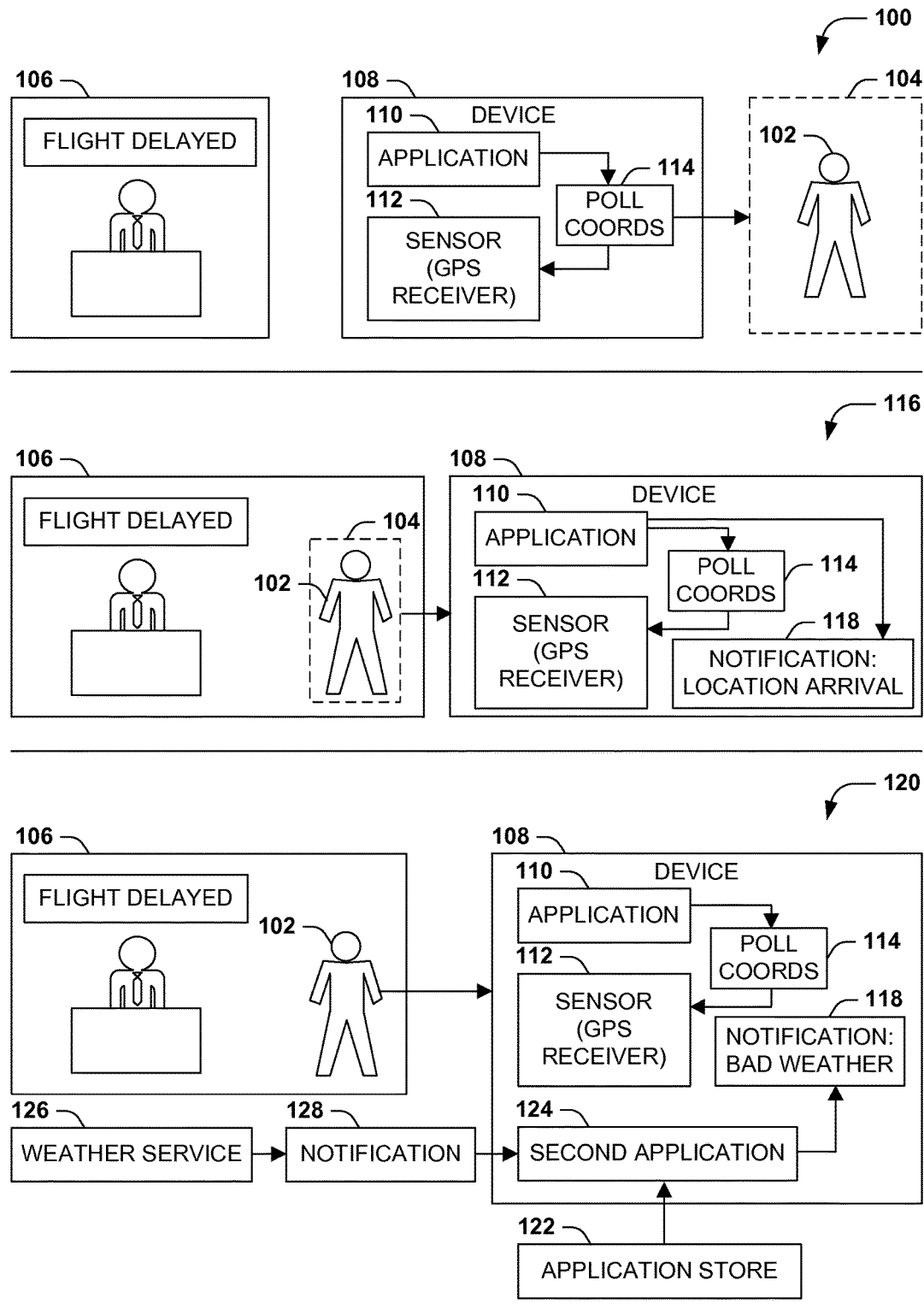
FIG. 1 is an illustration of an exemplary scenario featuring a device executing an application configured to evaluate a set of conditions and to perform an action upon detecting fulfillment of the conditions.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 presents an illustration of an exemplary scenario wherein a device 108 of a user 102 is configured to monitor a set of conditions, and to execute one or more actions as a result. This exemplary scenario involves a "geofencing" application, wherein the device 108 is configured to perform some actions automatically when the user 102 and/or device 108 arrives at a particular area 106 of interest. For example, the device 108 comprises a sensor 112 such as a global positioning system (GPS) receiver that is configured to detect a location 104 of the device 108 and/or user 102, and may report a set of geographic coordinates. An application 110 executing on a processor of the device 108 may poll 114 the coordinates of the sensor 112 at a particular frequency (e.g., once per second), and may compare the coordinates representing the location 104 with a set of coordinates specifying the area 106 (e.g., a range of latitude coordinates and longitude coordinates, and/or a detected location 104 within a distance threshold of a designated latitude/longitude coordinate of the area 106).

At a first time point 100 in the exemplary scenario of FIG. 1, the location 104 of the user 102 may be distant from the area 106 of interest, and the application 110 may perform no action other than continued polling 141 of the sensor 112.

At a second time point 116 in the exemplary scenario of FIG. 1, the application 110 may determine, through continued polling 114 of the sensor 112, that the device 108 may detect that the location 104 of the user 102 is now in the proximity of the area 106 of interest. Accordingly, the application 110 may notify the user 102 that he or she has arrived at the area 106, and/or may perform other actions, such as notifying a second user of the arrival of the user 102 at the area 106. The user 102 may also further use the application 110 to request various additional information, such as querying a flight service to determine whether the flight has been delayed.

At a third time point 120 in the exemplary scenario of FIG. 1, the user 102 may retrieve from an application store 122 a second application 124 that, when executed on the device 108, performs a polling 114 of a weather service 126 for notifications 182 relating to weather developments that may be of interest to the user 102 (e.g., the development of inclement weather near a home of the user 102). Upon receiving such a notification 128 from the weather service 126, the second application 124 may present a notification 118 of the inclement weather to the user 102. In this manner, the applications 110 may achieve the completion of various actions responsive to the detection of a related set of conditions.

However, in the exemplary scenario of FIG. 1, some limitations may arise in the configuration of the device 108 to achieve the completion of actions. As a first example, the reliance on polling 114 may diminish the resources of the device 108; e.g., periodic polling 114 of the sensor 112 and/or the weather service 126 may drain the battery and/or impose a residual consumption of computational power, memory, and/or network capacity, which are often limited in portable device 108. Additionally, such polling 114 may be redundant if performed by multiple applications 110 (e.g., a first application 110 and a second application 110 may poll for the arrival at the same area 106, thus utilizing twice as many resources as polling once on behalf of both applications 110), and/or may unhelpfully consume resources if the polled-for condition occurs infrequently (e.g., continuous polling 114 for the detection of arrival at an area 106 that the user 102 infrequently or never visits). As a second, in this exemplary scenario, each application 110 is configured to operate independently, e.g., in an isolated or "siloed" manner. That is, the first application 110 and the second application 124 do not cooperate in the polling 114 and notifications 118 presented for respective conditions. In this exemplary scenario, the detection by the first application 110 of the arrival of the user 102 at the area 106 may suggest that the user 102 is departing a home region for a distant destination, and that the user 102 may not be interested in the development of inclement weather in the home region. Accordingly, presentation of the notification 128 by the second application 124 may be regarded as a nuisance, but the absence of interaction between the first application 110 and the second application 124 may inhibit the detection of this aspect.

Additionally, in the exemplary scenario of FIG. 1, some architectural limitations may diminish the capacity of the device 108 to provide an expanded set of detected conditions and actions.

As a first such example, it may be difficult to extend the app-centric architecture in the exemplary scenario of FIG. 1 to enable multiple applications 110 to work together to detect a condition of interest. For example, a shared detection of an arrival of the user 102 at an airport (as detected from the coordinates reported by a global positioning receiver sensor 112); the identification of a travel ticket previously obtained by the user 102 to travel to a particular destination today (as detected from a clock component of the device 108); and a detection of proximity to a recognized security device requesting the reporting of an identifier of the user's travel ticket (such as an airline kiosk) may enable an automated provision of the requested information to check the user 102 into a flight automatically, without receiving user input from the user 102.

As a second such example, if the detection of conditions and performance of actions are performed by each application 110, it may be difficult to specify such rules at a comparatively high-level (i.e., hardware- and/or application-independent) manner. For example, it may be desirable to configure the device 108 to perform an action upon detecting the arrival of the user 102 at an area 106 (such as an airport) irrespective of the manner of determining such arrival, e.g., through a global positioning system (GPS) receiver, a detected interaction of the device 108 with other devices 108 that are only located in the area 106, a geographic triangulation with a wireless communication source, image evaluation of images received from a camera of the device 108 (e.g., visually identifying an airline kiosk), and/or user input received from the user 102. However, many such applications may be configured to utilize a particular detection mechanism (e.g., querying a global positioning receiver (GPS) receiver sensor 112), and may be incapable of extension to include other detection methods.

As a third such example, some applications 110 may be unable to respond to a detected condition in a suitable manner (e.g., a mapping application may primarily utilize a visual interface that is inapplicable to visually impaired users 102), and the device 108 may be incapable of finding a suitable substitute for the application 110 in responding a fulfillment of a condition.

As a fourth such example, the user 102 may possess two or more devices 108, but it may be difficult to configure the devices 108 to interoperate in the detection of conditions and execution of actions. For example, a first device 108 of the user may comprise a global positioning system (GPS) receiver, but the first device 108 may be out of reach of the user 102 who is interacting with a second device 108 that does not comprise a GPS receiver. It may be desirable to configure the second device 108 to present a notification 118 to the user 102 upon the first device 108 detecting the arrival of the user 102 at an area 106 of interest, but such interoperation may be difficult to achieve.

As a fifth such example, updating the logic of the detection of fulfillment of conditions and/or presentation of actions may be difficult. For example, updating an application 110 to respond to a newly identified condition and/or to perform a new type of action may be a comparatively involved process, particularly for large or complicated applications 110. However, such devices 108 may not have any other mechanism for providing such new functionality. For at least these reasons, the architecture depicted in the exemplary scenario of FIG. 1 may present various limitations of the responsiveness of the device 108 upon detecting the fulfillment of a monitored set of conditions.

B. Presented Techniques

Figure 2:
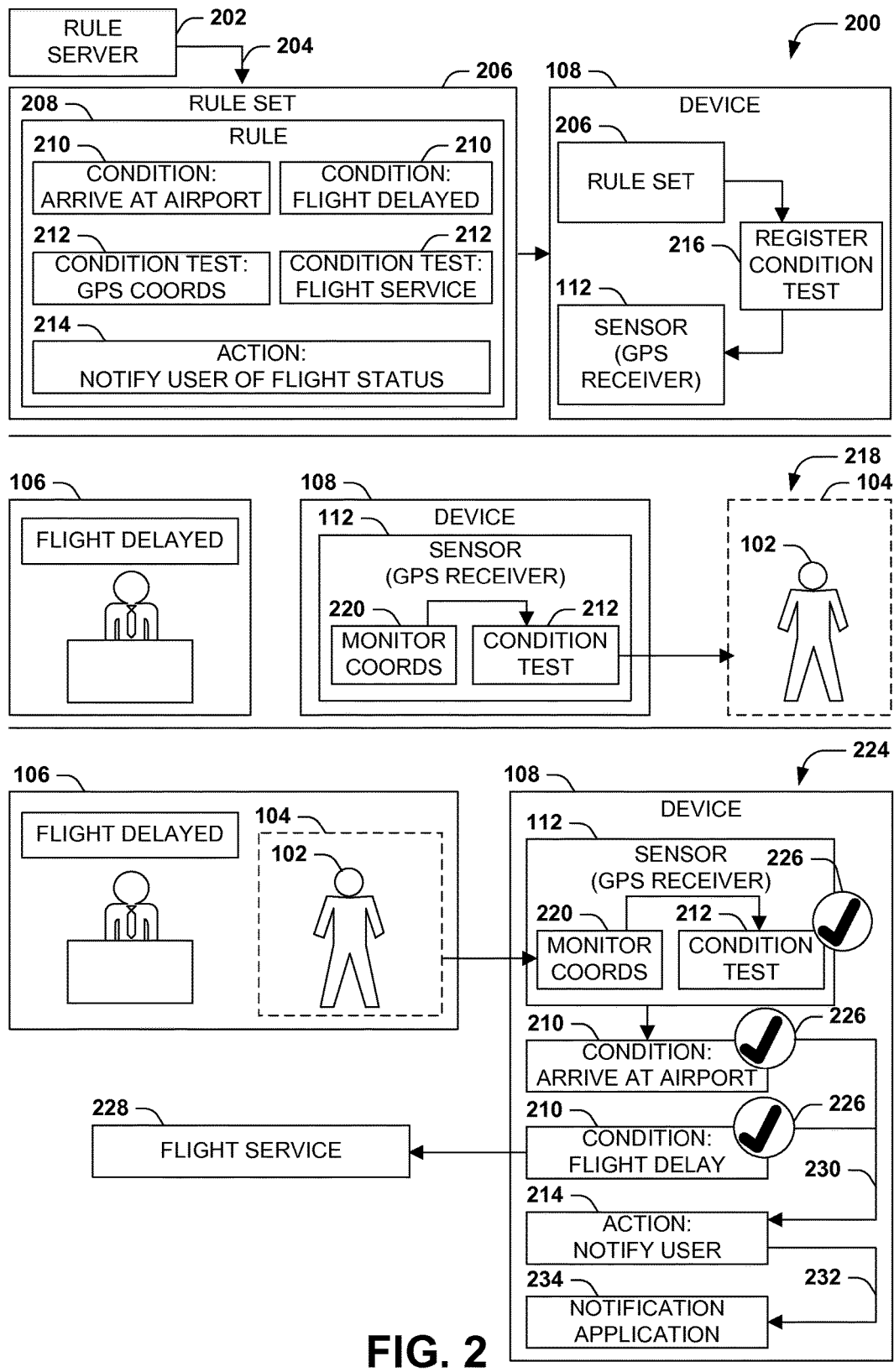
FIG. 2 is an illustration of an exemplary scenario featuring a device executing a device configured to register a set of condition tests with respective sensors of the device, and to invoke one or more actions upon receiving notifications of the fulfillment of the condition tests, in accordance with the techniques presented herein.

FIG. 2 presents an illustration of an exemplary scenario involving the configuration of a device 108 to perform actions responsive to the detection of fulfillment of conditions. In this exemplary scenario, a rule server 202 sends to the device 108 a rule set 206, comprising at least one rule 208 respectively comprising at least one condition 210; at least one condition test 212 whereby the device 108 may detect the fulfillment of a condition 210; and at least one action 214 to be executed upon detecting the fulfillment of the condition tests 212. In this exemplary scenario, the conditions 210 are specified at a comparatively high level in a hardware-independent manner, such as "the user 102 arrives at an airport" and "a flight is delayed," while the condition tests 212 indicate techniques that the device 108 may utilize to detect a fulfillment of a condition 210 (e.g., determining that the user 102 has arrived at an airport by comparing a detected set of GPS coordinates with those of known airports; and detecting a delay of a flight by querying a particular flight service 228 accessible over a network). At a first time point 200, the device 108 may receive the rule set 206 from the rule server 202 and may perform a registration 216 of the respective condition tests 212 with one or more sensors 112 of the device 108 (e.g., requesting a GPS receiver sensor 112 to notify the device 108 upon detecting coordinates within a coordinate set, and/or requesting a network adapter to notify the device 108 upon receiving a notification from a flight service 228 that a flight has been delayed). At a second time point 218, the sensor 112 of the device 108 may monitor 220 the condition test 212 registered with the sensor 112 (e.g., comparing the location 104 of the user 102 to detect arrival at an area 106 such as an airport). At a third time 224, upon detecting a fulfillment 226 of the condition test 212, such as the detection by the GPS receiver of a location 104 of the user 102 in the proximity of an area 106 comprising an airport, the sensor 112 may notify the device 108 of the fulfillment of the condition test 212. The device 108 may evaluate the conditions 210 of the rule 208 associated with the fulfilled condition test 212 (e.g., determining a fulfillment 226 of the first condition 210 has been fulfilled, and also determining the fulfillment 226 of the second condition 210 upon being notified by the flight service 228 of a flight delay). Accordingly, the device 108 may execute the action 214 associated with the rule 208, such as invoking 232 a notification application 234 to notify the user 102 of the flight delay.

In the manner depicted in the exemplary scenario of FIG. 2, the device 108 may achieve the evaluation of the rule 208 in accordance with the techniques presented herein. These techniques may provide various advantages over other techniques (such as those illustrated in the exemplary scenario of FIG. 1). As a first example, the techniques illustrated in FIG. 2 utilize a registration 216 mechanism for the fulfillment of condition tests 212 by sensors 112 rather than polling 114 the sensors 112, thus facilitating the efficiency of the device 108 (e.g., conserving the battery and computational resources of the device 108). For instance, the monitoring of the coordinates of the device 108 may be achieved even when no application 110 is executing that is responsive to the fulfillment of the condition test 212. As a second example, the determination of the fulfillment of the conditions 210, through the additional specification of condition tests 212 indicating a test performable by the device 108 to determine the fulfillment of a condition 210 specified in a hardware-independent manner, may enable the device 108 to respond more flexibly to the evaluation of the conditions 210. For example, the rule server 202 may choose the condition tests 212 for a particular device 108 in view of the sensors 112 of the device 108, thus adapting the conditions 210 to the capabilities of the device 108. As a third example, the specification of the conditions 210, condition rules 212, and/or actions 214 independently of particular applications 110 to satisfy such rules may enable a modular, multi-application approach to the application of a rule 208 (e.g., a first application may be invoked to evaluate a condition test 212 in conjunction with one or more sensors 112, and the action 214 may be executed through a second application 110, through a set of two or more applications 110 executing the same or different actions 214 of the rule 208, and/or by executing actions 214 on different devices than the detection of fulfillment 226 of the condition tests 212). These and other advantages may be achievable through the flexible rule set architecture depicted in the exemplary scenario of FIG. 2 and in accordance with the techniques presented herein.

C. Exemplary Embodiments

Figure 3:
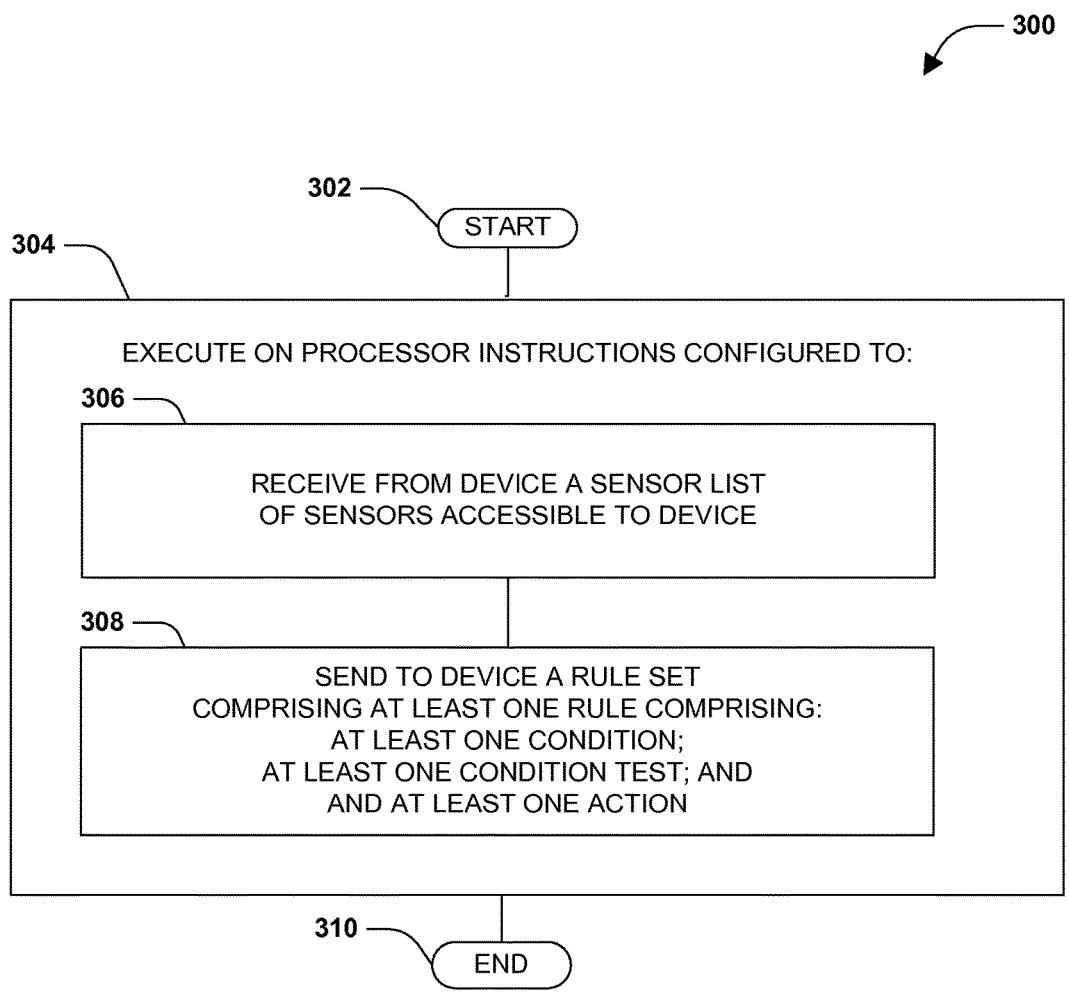
FIG. 3 is a flow diagram of an exemplary first method of configuring a device to execute actions in accordance with the techniques presented herein.

FIG. 3 presents a first exemplary embodiment of the techniques presented herein, illustrated as an exemplary method 300 of configuring devices 108 to execute actions 214 responsive to the fulfillment of a set of conditions 210. The exemplary method 300 may be implemented, e.g., as a set of instructions stored in a memory component of a rule sever 202, such as a memory circuit, a platter of a hard disk drive, a solid-state storage device, or a magnetic or optical disc, and organized such that, when executed on a processor of the rule sever 202, cause the rule sever 202 to operate according to the techniques presented herein. The exemplary method 300 begins at 302 and involves executing 304 the instructions on a processor of the rule sever 202. Specifically, the instructions are configured to receive 306 from a device 108 a sensor list of sensors 112 accessible to the device 108. The instructions are also configured to send 308 to the device 108 a rule set 206, comprising at least one rule 208 in turn comprising at least one condition 210 under which the rule 208 is triggered; at least one condition test 212 for registering at least one sensor 112 of the device 108 to evaluate at least one condition 210 of the rule 208; and at least one action 214 to be executed upon fulfillment of the conditions 210 of the rule 208. By instructing the device 108 as to the registration of condition tests 212 with the sensors 112 of the device 108 in order to detect conditions 210 resulting in the execution of actions 214 of one or more rules 208, the exemplary method 300 achieves the provision of a rule server 202 configured to enable the devices 108 to execute the actions 214 in accordance with the techniques presented herein, and so ends at 310.

Figure 4:
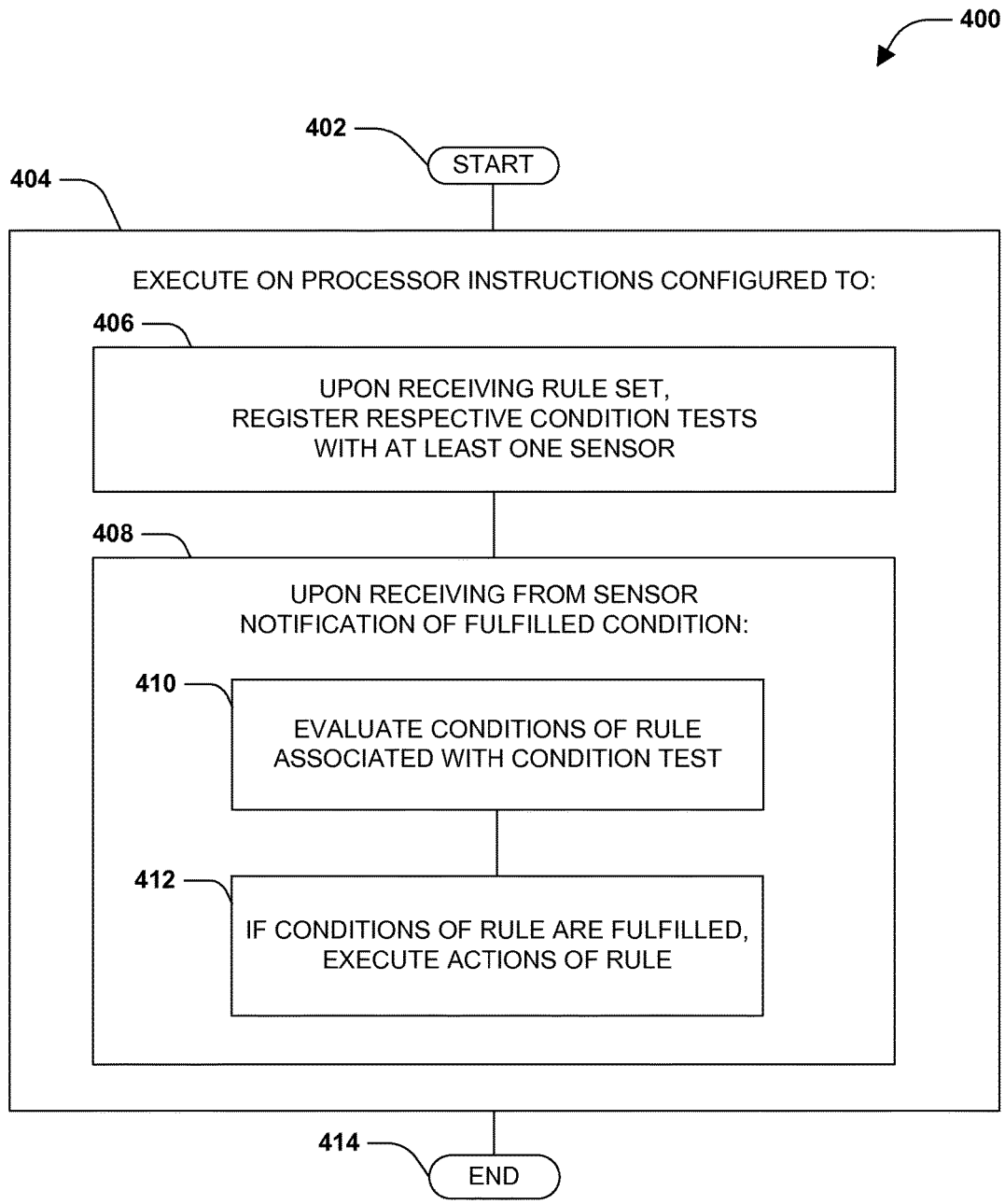
FIG. 4 is a flow diagram of an exemplary second method of configuring a device to execute actions in accordance with the techniques presented herein.

FIG. 4 presents a first exemplary embodiment of the techniques presented herein, illustrated as an exemplary method 400 of configuring a device 108 having at least one sensor 112 to execute actions 214 responsive to the fulfillment of a set of conditions 210. The exemplary method 400 may be implemented, e.g., as a set of instructions stored in a memory component of the device 108, such as a memory circuit, a platter of a hard disk drive, a solid-state storage device, or a magnetic or optical disc, and organized such that, when executed on a processor of the device 108, cause the device 108 to operate according to the techniques presented herein. The exemplary method 400 begins at 402 and involves executing 404 the instructions on a processor of the device 108. Specifically, the instructions are configured to, upon receiving from a rule server 202 a rule set 206 comprising at least one rule 208, which in turn comprises at least one condition 210 under which the rule 208 is triggered; at least one condition test 212 for evaluating at least one condition 210 of the rule 208; and at least one action 214 to be executed upon fulfillment of the conditions 210, register 406 the respective condition tests 212 with at least one sensor 112 of the device 108. The instructions are also configured to, upon receiving 408 from a sensor 112 a notification of a fulfilled condition test 212, evaluate 410 the conditions 210 of the rule 208 associated with the condition test 212; and upon determining a fulfillment 226 of the conditions 210 of the rule 208, execute 308 the at least one action 214 of the rule 208. In this manner, the exemplary method 400 of FIG. 4 may enable the device 108 to achieve the execution of the actions 214 responsive to the detected fulfillment 226 of the conditions 210 in accordance with the techniques presented herein, and so ends at 414.

Figure 5:
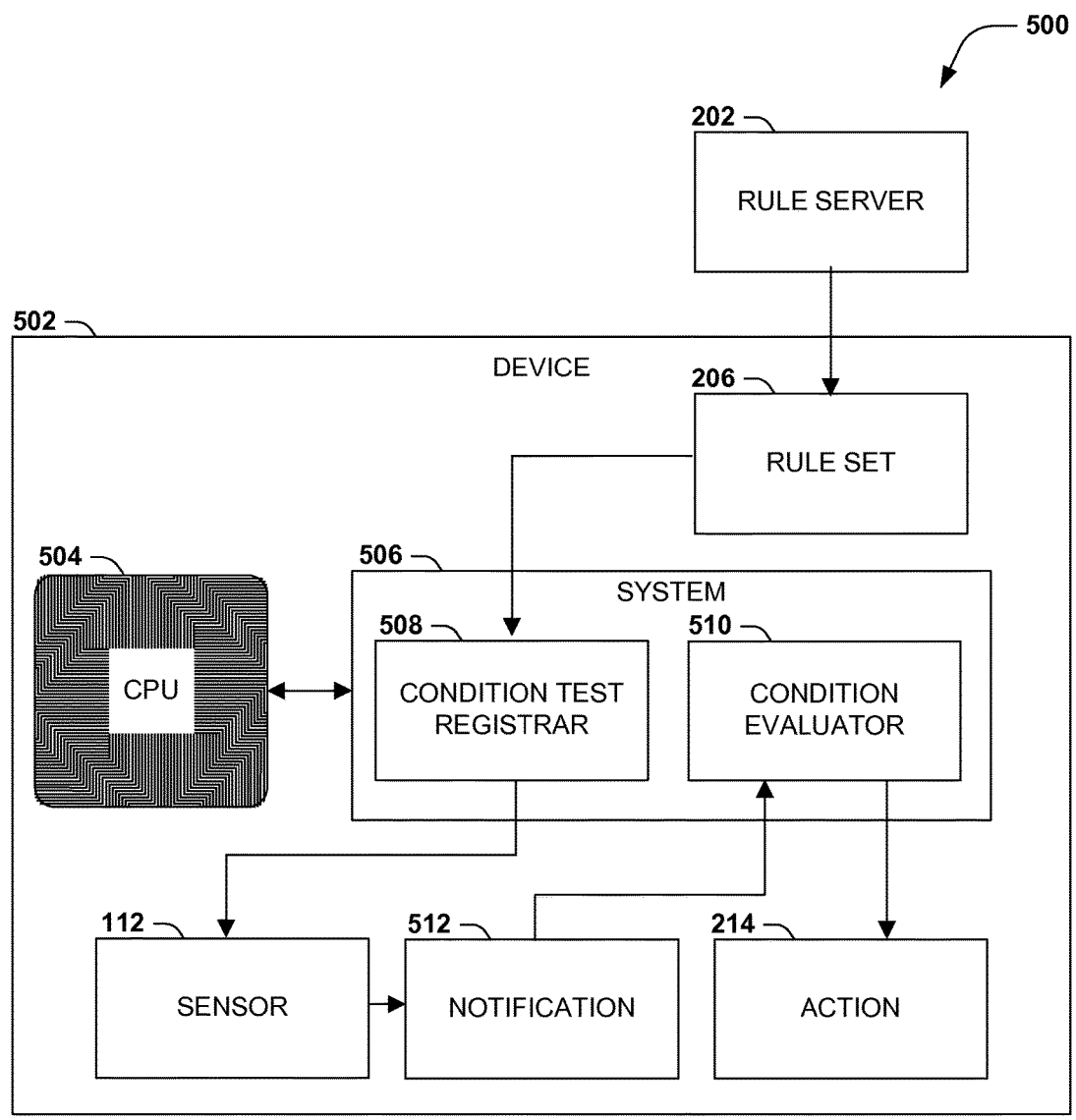
FIG. 5 is a component block diagram of an exemplary system configured to configure a device to execute actions in accordance with the techniques presented herein.

FIG. 5 presents a third exemplary embodiment of the techniques presented herein, illustrated as an exemplary scenario 500 featuring an exemplary system 506 configured to cause a device 502 to execute actions 214 responsive to a fulfillment of a set of conditions 210. The exemplary system 506 may be implemented, e.g., as a set of components respectively comprising a set of instructions stored in a memory component of a device 502 having a processor 504, where the instructions of respective components, when executed on the processor 504, cause the device to perform a portion of the techniques presented herein. The exemplary system 506 includes a condition test registrar 508, comprising instructions that are configured to, for a rule set 206 received from a rule server 202, register the respective condition tests 212 for the respective conditions 210 of the rule 208 with at least one sensor 112 of the device 502. The exemplary system 506 may also include a condition evaluator 510 comprising instructions that, when executed on the processor 504, cause the device 502 to, upon receiving a notification 512 from a sensor 112 of a fulfillment of a condition test 212, evaluate the conditions 210 of the rule 208, and upon determining a fulfillment 226 of the conditions 210 of the rule 208, execute at least one action 214 specified by the rule 208. In this manner, the exemplary system 506 enables the device 502 to apply a rule set 206 and execute the actions 214 responsive to the conditions 210 of respective rules 208 of the rule set 206 in accordance with the techniques presented herein.

Still another embodiment involves a computer-readable medium comprising processor-executable instructions configured to apply the techniques presented herein. Such computer-readable media may include, e.g., computer-readable storage devices involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage devices) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 6:
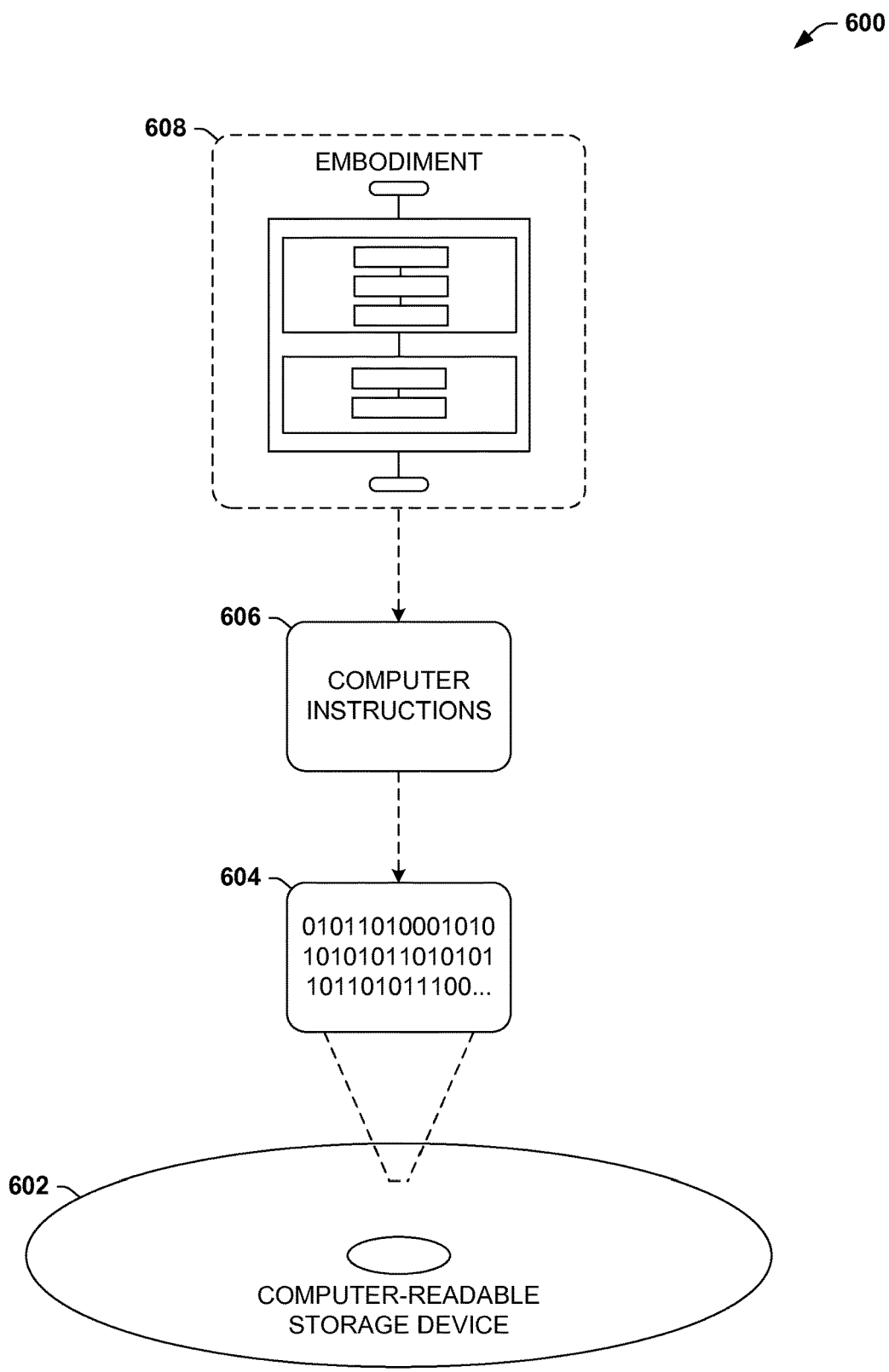
FIG. 6 is an illustration of an exemplary computer-readable medium comprising processor-executable instructions configured to embody one or more of the provisions set forth herein.

An exemplary computer-readable medium that may be devised in these ways is illustrated in FIG. 6, wherein the implementation 600 comprises a computer-readable storage device 602 (e.g., a CD-R, DVD-R, or a platter of a hard disk drive), on which is encoded computer-readable data 604. This computer-readable data 604 in turn comprises a set of computer instructions 606 configured to operate according to the principles set forth herein. In one such embodiment, the processor-executable instructions 606 may be configured to perform a method 608 of configuring devices 108 to execute actions 214 responsive to the fulfillment of conditions 210 of respective rules 208 of a rule set 206, such as the exemplary method 300 of FIG. 3. In another such embodiment, the processor-executable instructions 606 may be configured to implement a method 608 of configuring a device 108 to execute actions 214 responsive to the fulfillment of conditions 210 of respective rules 208 of a rule set 206, such as the exemplary method 400 of FIG. 4. In still another embodiment, the processor-executable instructions 606 may implement a system configured to cause a device 108 to execute actions 214 responsive to the fulfillment of conditions 210 of respective rules 208 of a rule set 206, such as the exemplary system 506 of FIG. 5. of FIG. 5. Some embodiments of this computer-readable medium may comprise a computer-readable storage device (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 300 of FIG. 3; the exemplary method 400 of FIG. 4; and the exemplary system 506 of FIG. 5) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized to achieve the configuration of a variety of devices 108, such as workstations, servers, laptops, tablets, mobile phones, game consoles, portable gaming devices, portable or non-portable media players, media display devices such as televisions, appliances, home automation devices, and supervisory control and data acquisition (SCADA) devices.

As a second variation of this first aspect, the devices 108 and rules 208 may involve various types of physical sensors 112, such as global positioning system (GPS) receivers; gyroscopes and/or accelerometers; still or motion cameras; microphones; device sensors, such as personal area network (PAN) sensors and network adapters; human input devices such as keyboards, mice, and touch-sensitive displays; electromagnetic sensors; temperature, barometric pressure, humidity, and/or moisture sensors; proximity sensors; compasses; and/or ambient light sensors. Alternatively or additionally, the devices 108 and rules 208 may involve various types of logical sensors 112, such as interfaces that detect the occurrence of an event relating to a software or hardware process, or that monitor the receipt of data from a service over a network (e.g., an email client monitoring for the receipt of a particular email message or cloud service notification).

As a third variation of this first aspect, respective sensors 112 may monitor the fulfillment of a condition 210 in various ways. As a first example, the sensors 112 may include an interrupt or trigger that is configured to raise a notification within the sensor 112 that a monitored condition 210 has been fulfilled. As a second example, the sensors 112 may poll a data source for fulfillment of a monitored condition 210 on behalf of a variety of conditions 210. For example, in a geofencing scenario, a global positioning system (GPS) receiver may occasionally detect a current location of the device 108, and may compare the detected location with a potentially large set of designated coordinate regions, where a match between any such designated coordinate region and the current location of the device 108 may be construed as the fulfillment of a condition 210. By comparing each detected current location with many sets of coordinate regions, such a GPS receiver may utilize polling in a more efficient, multiplexed manner, rather than separate polling of the location being performed for each individual coordinate region.

As a fourth variation of this first aspect, the rule server 202 and the device 108 may have various relationships. As a first such example, the rule server 202 may be provided on the device 108, such as an embedded software library that selects condition tests 212 suitable for the sensors 112 of the device 108. As a second such example, the rule server 202 may comprise a separate device communicating with the device 108 over an ad hoc, one-to-one, or multipoint wired or wireless network, such as a local area network or the internet.

As a fifth variation of this first aspect, the rules 208 provided by the rule server 202 may involve many types of conditions 210 (e.g., detecting an action of the user 102; detecting an event occurring in the past, currently, or in the future that may be of interest to the user 102; and/or discovering information that may relate to the user 102). Additionally, many types of condition tests 212 may be evaluated by the sensors 112 in order to detect the fulfillment of a condition 210; e.g., the device 108 may detect the receipt of a particular type of input from a sensor 112; the detection of a real-world property by the sensor 112, such as the arrival at a particular set of geographic coordinates; the occurrence of a particular sensor state of the sensor 112; and/or the results of a particular computation performed by the sensor 112. Additionally, many types of actions 214 may be executed in response to the detected fulfillment 226 of the conditions 210, such as the execution of a particular application 110; the presentation of a notification to the user 102; the storage of a particular type of data on the device 108 for later use; the notification of another device 108 of the fulfillment of the rule 208; and/or sending data to a service, such as a software component or interface operating on the device 108 or a cloud service. Many such variations may be devised by those having ordinary skill in the art in accordance with the techniques presented herein.

D2. Rule Set; Condition Test Evaluation; Action Execution

A second aspect that may vary among embodiments of these techniques involves the configuration of a device 108 to receive a rule set 206; to evaluate a set of condition tests 212 using at least one sensor 112; and to execute the actions 214 specified by the rule 208.

As a first variation of this second aspect, the device 108 may receive a device-independent rule set 206 from the rule server 202, and may endeavor to find techniques for fulfilling the condition tests 212 of the rules 208 of the rule set 206 (e.g., querying respective sensors 112 to determine whether each sensor 112 is capable of accepting a registration 216 to detect a fulfillment 226 of a condition test 212). Additionally, if the device 108 detects that at least one condition test 212 is indeterminable by a sensor 112 of the device 108 (e.g., that a sensor 112 is generally capable of providing and/or monitoring data related to a condition 210 but not in the manner specified by the condition test 212), the device 108 may request from the rule server 202 an alternative condition test 212 that is determinable by the sensor 112, and, upon receiving from the rule server 202 an alternative condition test, may initiate a registration 216 of the alternative condition test with the sensor 112. For example, if a location-based condition test 212 involves a detection of a velocity of the device 108, but a global positioning system (GPS) is not capable of monitoring the velocity of the device 108, an alternative condition test 212 may be provided involving a comparative detection of the location 104 of the device 108 over a period of time. Similarly, a rule server 202 may be configured to, upon receiving from a device 108 a request for an alternative condition test 212 that is determinable by at least one sensor 112 of the device 108, identify an alternative condition test 212 for the rule 208 that is determinable by at least one selected sensor 112 of the device 108, and send the alternative condition test 212 for the rule 208 to the device 108.

As a second variation of this second aspect, the device 108 may identify and/or describe itself to the rule server 202 (e.g., by providing a model identifier of a model of the device 108; by providing a list of capabilities achievable by the sensors 112 of the device 108; and/or by providing to the rule server 202 a sensor manifest of the sensors 112 accessible to the device 108), and may receive from the rule server 202 a rule set 206 selected by the rule server 202 in view of the sensors 112 of the device 108, i.e., a rule set 206 comprising condition tests 212 that are respectively determinable by the sensors 212 accessible to the device 108. Additionally, upon detecting a condition test 212 that is indeterminable by any sensor 112 of the device 108, the device 108 may notify the rule server 202 of the sensors 112 that are accessible to the device 108, and may request from the rule server 202 an alternative condition test 212 that is determinable by at least one of the sensors 108 accessible to the device 108. Upon receiving from the rule server 202 an alternative condition test 212 that is determinable by a selected sensor 112, the device 108 may initiate a registration 216 of the alternative condition test 212 with the selected sensor 112. For example, if a condition test 212 of a rule 208 of the rule set 206 involves a detection of a location 104 of a device 108 having no sensors 112 capable of detecting a location 104, the rule server 202 may provide an altered rule set 206 that provides an alternative condition test 212 based upon time, e.g., presuming that the user 102 is at a predicted location 104 at a particular time, even if the location 104 cannot be detected by the device 108.

As a third variation of this second aspect, the device 108 may be configured to refrain from polling a sensor 112 in order to detect the fulfilled condition test 212. Rather, the device 108 may be configured to await a notification from the sensor 112 of the fulfillment 226 of a condition test 212, thereby alleviating the device 108 from the computational burden of polling. Alternatively, upon determining that a sensor 112 of the device 108 is capable of reporting data that may indicate a fulfillment 226 of a condition test 212 but is not capable of accepting a registration 216 for the condition test 212, the device 108 may poll the sensor 112 for the fulfillment 226 of the condition test 212 as a less efficient option than registration 216, but as a more advantageous option than failing to detect the condition test 212.

As a fourth variation of this second aspect, at least one selected condition test 212 may comprise an instruction set to be evaluated by the sensor 112 in determining a fulfillment 226 of the condition test 212. For example, rather than specifying a coordinate associated with an area 106 of interest for comparison with a detected location 104 of a device 108, the rule set 206 may specify a sequence of coordinates to be compared with a sequence of detected locations 104 in order to specify a condition test 212 as the completion of a particular route. Accordingly, the device 108 may request the sensor 112 to execute the instruction set of the selected condition test 212 in order to determine the fulfillment 226 of the selected condition test 212.

As a fifth variation of this second aspect, the device 108 execute the actions 214 of the rule 208 in various ways. As a first example, the rule 208 may specify an application 110 to be invoked in order to execute the action 214. Such an application 110 may be specified with a distinctive identifier (e.g., an instruction to execute a particular application 110), or according to the capabilities of such an application (e.g., "execute a web browser application 110 that is capable of displaying a web page"). Alternatively, the rule server 202 may provide an application 110 to the device 108 that may be invoked as an action 214 of a rule 208, and the device 108 may store the received application 110 and invoke the application 110 upon detecting the fulfillment 226 of the condition tests 212 of the rule 208. As a second example, the action 214 may be specified in a hardware- and application-independent manner; e.g., "notify the user 102," and the device 108 may select among the available mechanisms for notifying the user 102 of the results of the rule 208. Additionally, the device 108 may be configured to determine whether the device 108 stores at least one application 110 executable to perform the action 214; and upon identifying a selected action 214 for which the device 108 does not store an application 110 executable to perform the action 214, the device 108 may automatically retrieve and store an application 110 that is executable to perform the action 214, and then invoke the application 110 in order to fulfill the rule 208.

Figure 7:
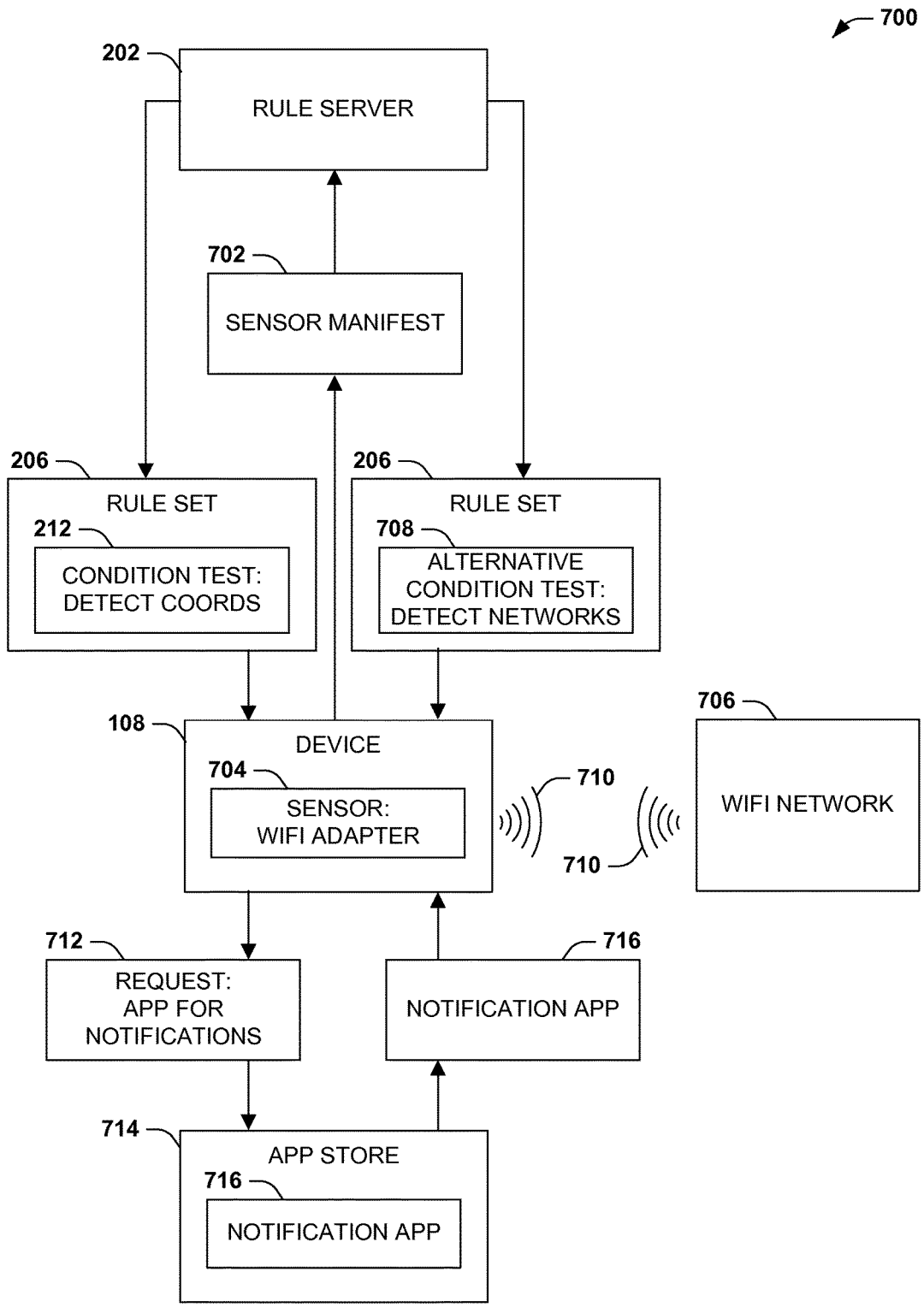
FIG. 7 is an illustration of an exemplary scenario featuring an interaction between a rule server and a device to achieve the detection of a fulfillment of a condition test and the performance of an action in accordance with the techniques presented herein.

FIG. 7 presents an illustration of an exemplary scenario 700 featuring several such variations of the techniques presented herein. In this exemplary scenario 700, a device 108 comprising a WiFi adapter 704 as a sensor 112 may receive a rule set 206 from a rule server 202 including a condition 210 involving the arrival of the device 108 at a particular location 104, and a condition test 212 for the condition 210 that involves a detection of a set of geographic coordinates associated with the location 104. However, upon receiving the rule set 206, the device 108 may determine that its sensors 112 are incapable of detecting coordinates. Accordingly, the device 108 may send to the rule server 202 a request for an alternative condition test 212, including a sensor manifest 702 identifying the sensors 112 that are accessible to the device 108. Upon receiving the request and the sensor manifest 702, the rule server 202 may determine that the condition 210 may also be fulfilled by detecting the availability of a particular WiFi network 706 in that is within the proximity of the location 104, and may send to the device 108 a second rule set 206 comprising an alternative condition test 708 involving the detection of the WiFi network 706. The device 108 therefore initiate a registration 216 with the WiFi adapter 704 to request a notification upon detecting the availability of the WiFi network 706; and when the WiFi adapter 704 subsequently communicates 710 with the WiFi network 706, the WiFi adapter 704 may notify the device 108 of the fulfillment 226 of the alternative condition test 708. Additionally, the rule set 206 may specify, as the action 214 executable to fulfill the rule 208, a notification to be presented to the user 102. However, the device 108 may determine that it does not have a suitable notification app 716, and may automatically initiate with an app store 714 a request 712 for a suitable notification app 716. Upon receiving a suitable notification app 716 from the app store 714, the device 108 may invoke the notification app 716 in order to fulfill the rule 208. In this manner, by utilizing several of the variations presented herein, the device 108 may provide a flexible evaluation and fulfillment of rules 208 in accordance with the techniques presented herein.

D3. Multiple Device Variations

A third aspect that may vary among embodiments of these techniques involves a scenario wherein one or more users 102 utilize a set of at least two devices 108. Various techniques may be utilized to achieve a collective evaluation and/or fulfillment 226 of the rules 208 of a rule set 206 in accordance with the techniques presented herein.

As a first variation of this third aspect, the rule server 202 may have access to two or more devices 108, and may be configured to distribute the rule set 206 to the set of devices 108. As a first such example, for respective devices 108, the rule server 202 may identify a subset of the rule set 206 that is applicable to the device 108, and send to the device 108 only the subset of the rule set 202 that is applicable to the device 108. For example, if a first rule 208 involves an action 214 executable upon arrival of the individual 102 at a particular location 104 and a second rule 208 involves an action 214 executable upon detecting a particular physical activity performed by the user 102 (e.g., jogging), and if a first device 108 comprises a global positioning system (GPS) receiver while a second device 108 comprises an accelerometer, the rule server 202 may send the first rule 208 only to the first device 108, and may send the second rule 208 only to the second device 108. Additionally, upon receiving an update of the rule set 206, the rule server 202 may be configured to synchronize the update of the rule set 206 among the at least two devices 108.

As a second variation of this third aspect, the rule set 206 may comprise at least one rule 208 comprising at least one condition test 212 to be registered with a sensor 112 of a first device 108, and at least one action 214 to be executed by a second device 108 upon fulfillment of the conditions 210 of the rule 208. That is, the rule set 206 may specify that when the sensor 112 of the first device 108 detects the fulfillment 226 of a condition test 212, the second device 108 is to execute a particular action 214. In a first such example, the rule server 202 may mediate this interoperation; e.g., the rule server 202 may be configured to, upon receiving from the first device 108 a notification that the sensor 112 of the first device 108 has detected a fulfillment 226 of the condition test 212, the rule server 202 may evaluate the conditions 210 of the rule 208 associated with the condition test 212, and, if the conditions 212 of the rule 208 are fulfilled, notify the second device 108 of the fulfillment 226 of the conditions 210 of the rule 208 (as an instruction for the second device 108 to execute the action 214 of the rule 208). Alternatively or additionally, the devices 108 may interoperate as peers. For example, a first device 108 may request a second device 108 that is accessible to the first device 108 to initiate a registration 216 of a condition test 212 with a sensor 112 of the second device 108. The second device 108 may therefore be configured to initiate the registration 216 on behalf of the first device 108, and to notify the first device 108 upon receiving a notification from the sensor 112 of the fulfillment 226 of the condition test 212, and the first device 108 may be configured to, upon receiving the notification from the second device 108 of the fulfillment 226 of the condition test 212, execute the actions 214 of the rule 208.

Figure 8:
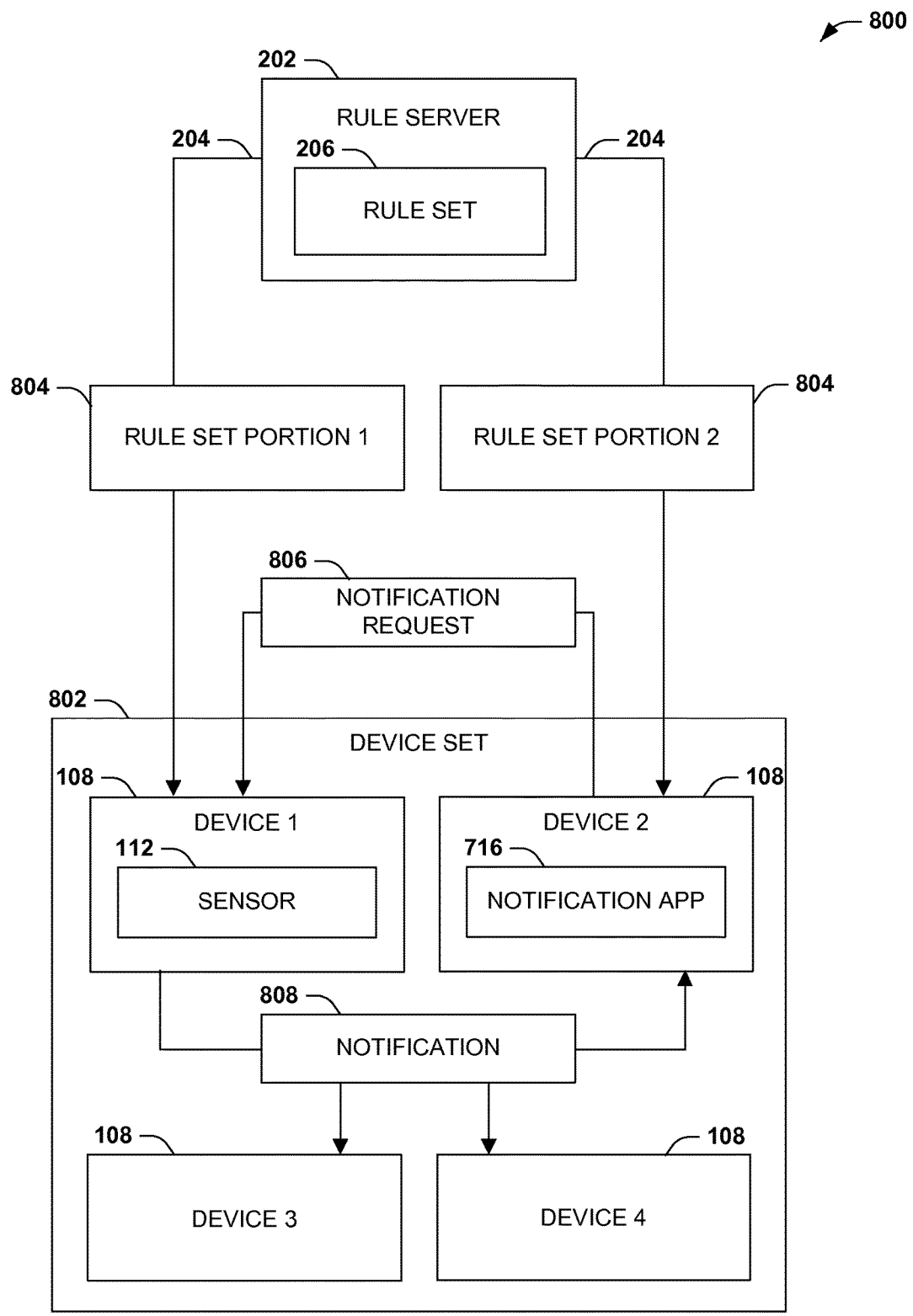
FIG. 8 is an illustration of an exemplary scenario featuring an interaction between a rule server and a set of devices to achieve the detection of a fulfillment of a condition test and the performance of an action in accordance with the techniques presented herein.

FIG. 8 presents an illustration of an exemplary scenario 800 featuring an interoperation of a device set 802 and a rule server 202 to achieve the fulfillment of a rule set 206 utilizing several of the variations provided herein. In this exemplary scenario 800, the device set 108 may comprise a first device 108 comprising a sensor 112, and a second device 108 comprising a notification app 716. The rule server 202 may be configured to, for each device 108 of the device set 802, identify a rule set portion 804 of the rule set 206 that is applicable to the device 108 (e.g., a first rule set portion 804 involving a registration 216 of a condition test 212 involving the sensor 112 that is applicable to the first device 108, and a second rule set portion 804 involving the execution of the notification app 716 that is applicable to the second device 108. The rule server 202 may send the first rule set portion 804 to the first device 108, and the second rule set portion 804 to the second device 108. Additionally, the second device 108 may send to the first device 108 a notification request 806 for the first device 108 to notify the second device 108 if the sensor 112 detects a fulfillment 226 of the condition test 212. Accordingly, when the sensor 112 notifies the first device 108 of a fulfillment 226 of the condition test 212, the first device 108 may send a notification 808 of the fulfillment 226 of the condition test 212 to the second device 108, which may execute the notification app 716 in fulfillment of the rule 206. The action 214 may also involve sending a notification 808 to other devices 108 of the device set 802; e.g., upon detecting an arrival at an airport, a first device 108 may send a notification 808 to a third device 108 of a family member with a request for transportation from the airport. In this manner, the device set 802 and rule server 202 may interoperate to achieve the fulfillment of the rule set 206 in accordance with several variations of the techniques presented herein.

E. Computing Environment

Figure 9:
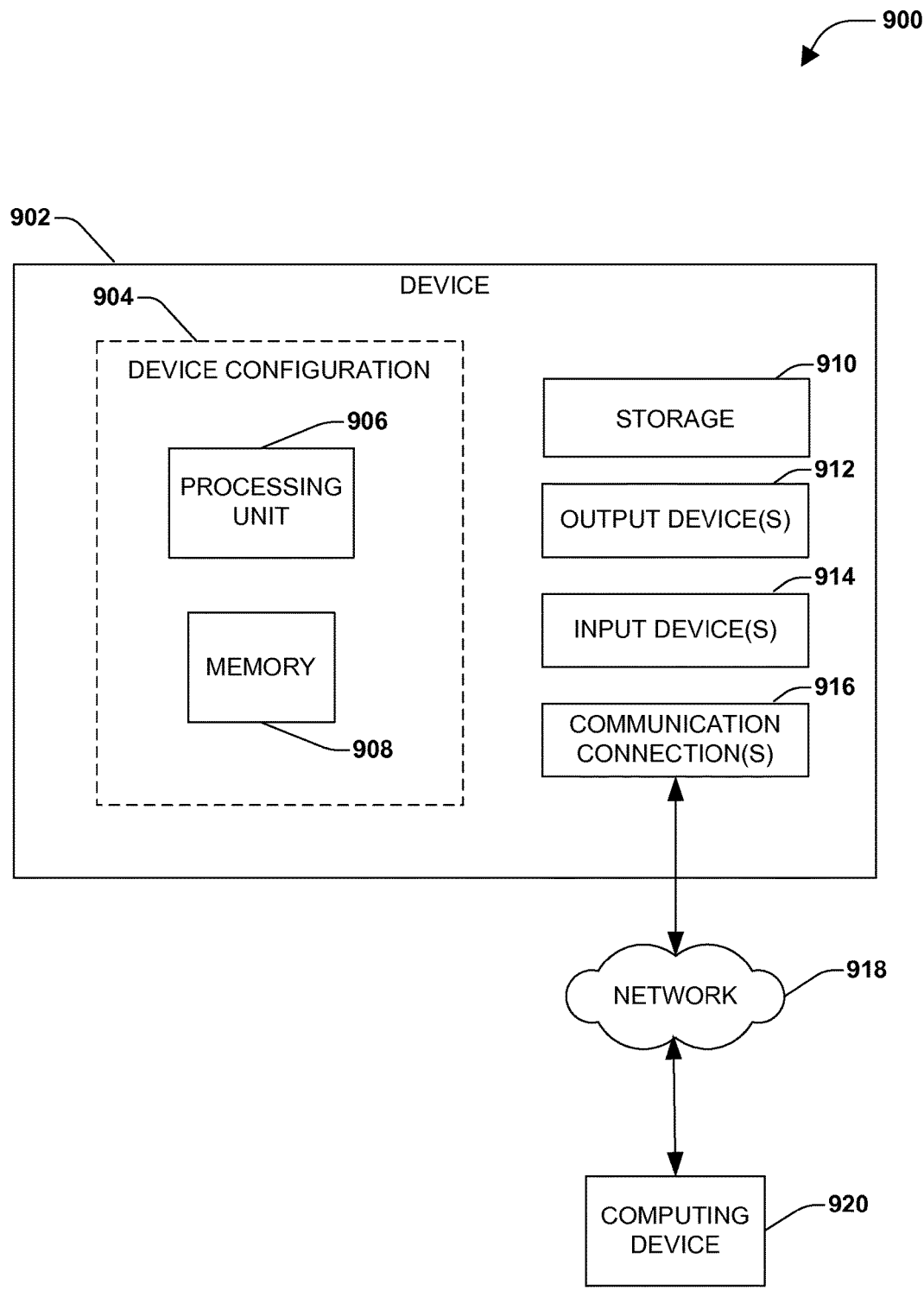
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 902 configured to implement one or more embodiments provided herein. In one configuration, computing device 902 includes at least one processing unit 906 and memory 908. Depending on the exact configuration and type of computing device, memory 908 may be volatile (such as RAM, for example), non-volatile (such as ROM, flash memory, etc., for example) or some combination of the two. This configuration is illustrated in FIG. 9 by dashed line 904.

In other embodiments, device 902 may include additional features and/or functionality. For example, device 902 may also include additional storage (e.g., removable and/or non-removable) including, but not limited to, magnetic storage, optical storage, and the like. Such additional storage is illustrated in FIG. 9 by storage 910. In one embodiment, computer readable instructions to implement one or more embodiments provided herein may be in storage 910. Storage 910 may also store other computer readable instructions to implement an operating system, an application program, and the like. Computer readable instructions may be loaded in memory 908 for execution by processing unit 906, for example.

The term "computer readable media" as used herein includes computer-readable storage devices. Such computer-readable storage devices may be volatile and/or non-volatile, removable and/or non-removable, and may involve various types of physical devices storing computer readable instructions or other data. Memory 908 and storage 910 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 902 may also include communication connection(s) 916 that allows device 902 to communicate with other devices. Communication connection(s) 916 may include, but is not limited to, a modem, a Network Interface Card (NIC), an integrated network interface, a radio frequency transmitter/receiver, an infrared port, a USB connection, or other interfaces for connecting computing device 902 to other computing devices. Communication connection(s) 916 may include a wired connection or a wireless connection. Communication connection(s) 916 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 902 may include input device(s) 914 such as keyboard, mouse, pen, voice input device, touch input device, infrared cameras, video input devices, and/or any other input device. Output device(s) 912 such as one or more displays, speakers, printers, and/or any other output device may also be included in device 902. Input device(s) 914 and output device(s) 912 may be connected to device 902 via a wired connection, wireless connection, or any combination thereof. In one embodiment, an input device or an output device from another computing device may be used as input device(s) 914 or output device(s) 912 for computing device 902.

Components of computing device 902 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 902 may be interconnected by a network. For example, memory 908 may be comprised of multiple physical memory units located in different physical locations interconnected by a network.

Those skilled in the art will realize that storage devices utilized to store computer readable instructions may be distributed across a network. For example, a computing device 920 accessible via network 918 may store computer readable instructions to implement one or more embodiments provided herein. Computing device 902 may access computing device 920 and download a part or all of the computer readable instructions for execution. Alternatively, computing device 902 may download pieces of the computer readable instructions, as needed, or some instructions may be executed at computing device 902 and some at computing device 920.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an"

as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of configuring devices to perform actions, the method involving a rule server having a processor, the processor executing instructions configured to:
   send, by the rule server, a rule set to a device, the rule set including at least one rule comprising:
      at least one condition under which the at least one rule is triggered, wherein the at least one condition is specified in a manner that does not require a particular sensor of the device to be used to detect fulfillment of the condition;
      at least one condition test to evaluate the at least one condition of the at least one rule, wherein the at least one condition test specifies a first sensor type of the device for evaluating the at least one condition; and
      at least one action to be executed upon fulfillment of the at least one condition;
   receive a request for an alternative condition test based on a determination that the at least one condition test is indeterminable by the device using the first sensor type, wherein the alternative condition test is determinable by the device using a second sensor type of the device; and
   cause the alternative condition test to be registered to the second sensor type on the device prior to the fulfillment of the at least one condition;
   wherein the at least one rule relates to tasks for a plurality of applications on the device, wherein a service of the device monitors fulfillment of conditions respectively associated with the at least one rule, and wherein the service does not require the plurality of applications to be executing during the monitoring.

2. The method of claim 1, wherein:
   the rule server has access to at least two devices; and
   sending the rule set to the device further comprises:
      sending the rule set to the at least two devices.

3. The method of claim 2, wherein sending the rule set to the respective devices further comprises:
   identifying a subset of the rule set applicable to the device; and
   sending to the device the subset of the rule set that is applicable to the device.

4. The method of claim 2, wherein the rule set comprises at least one rule comprising:
   at least one condition test to be registered with a sensor of a first device; and
   at least one action to be executed by a second device upon fulfillment of the conditions of the rule.

5. The method of claim 2, wherein the instructions are further configured to, upon receiving an update of the rule set, synchronize the update of the rule set among the at least two devices.

6. The method of claim 1, wherein the rule server selects the alternative condition test based on the list of sensors.

7. The method of claim 1, wherein receiving the request for an alternative condition test comprises receiving a description of the device, the description indicating available sensors of the device.

8. A computer-readable storage device not consisting of a propagated data signal, the computer-readable storage device comprising instructions that, when executed on a processor of a device having access to at least one sensor, perform actions by:
   receiving, by the device, a rule set from a rule server, the rule set including a rule comprising:
      at least one condition under which the rule is triggered, wherein the at least one condition is specified in a manner that does not require a particular sensor of the device to be used to detect fulfillment of the condition,
      at least one condition test for evaluating at least one condition of the rule, wherein the at least one condition test specifies a first sensor type of the device for evaluating the at least one condition, and
      at least one action to be executed upon fulfillment of the at least one condition;
   using an evaluation process of the device to evaluate whether the at least one condition test is determinable using the first sensor type;
   upon detecting the at least one condition test is indeterminable using the first sensor type, requesting from the rule server an alternative condition test that is determinable using the first sensor type; and
   causing the alternative condition test to be registered with at least one sensor corresponding to the first sensor type;
   wherein the rule relates to tasks for a plurality of applications on the device, wherein a service of the device monitors fulfillment of conditions respectively associated with the at least one rule, and wherein the service does not require the plurality of applications to be executing during the monitoring.

9. The computer-readable storage device of claim 8, further comprising:
   sending to the rule server at least one of:
      a model identifier of a model of the device;
      a sensor manifest of the sensors accessible to the device; and
      a list of capabilities achievable by the sensors accessible to the device; and
   receiving from the rule server a rule set comprising condition tests that are respectively determinable by the sensors accessible to the device.

10. A method of performing actions responsive to conditions detected by a device having a processor and access to a first sensor, the method comprising:
  receiving, by the device, a rule set from a rule server, the rule set comprising one or more rules relating to tasks for a plurality of applications on the device, the one or more rules respectively comprising:
    a condition under which a respective rule is triggered, wherein the condition is specified at a hardware-independent level for the device, a service of the device monitors fulfillment of the condition, and the service does not require the plurality of applications to be executing during the monitoring;
    a condition test for evaluating the condition, wherein the condition test specifies the use of a second sensor not accessible to the device; and
    an action;
  using a sensor evaluation process of the device to determine the condition test is indeterminable by the second sensor;
  in response to determining the condition test is indeterminable by the second sensor, requesting from the rule server an alternative condition test that is determinable by the first sensor;
  causing the alternative condition test to be registered with the first sensor;
  upon receiving from the first sensor a notification that the alternate condition test has been fulfilled, evaluating the at least one condition associated with the condition test; and
  if the at least one condition is fulfilled, executing the action of the rule.

11. The method of claim 10, wherein receiving the notification from the first sensor further comprises: refraining from polling the first sensor to detect the fulfilled condition test.

12. The method of claim 10, wherein receiving the rule set from the rule server further comprises:
  sending to the rule server a sensor manifest of the sensors accessible to the device; and
  receiving from the rule server a rule set comprising condition tests that are respectively determinable by the sensors accessible to the device.

13. The method of claim 10, wherein:
  the at least one selected action further comprises an execution of an application; and
  executing the selected action further comprises: invoking the application.

14. The method of claim 13, wherein the at least one action of at least one rule comprises sending data to a service.

15. The method of claim 13, wherein the instructions are further configured to:
  for the respective actions of the rule set, determine whether the device stores at least one application executable to perform the action; and
  upon identifying a selected action for which the device does not store an application executable to perform the action, retrieve an application executable to perform the action.

16. The method of claim 10, wherein:
  the first sensor is provided by a second device in communication with the device; and
  registering the respective condition tests further comprises: requesting the second device to register the condition test with the first sensor.

17. The method of claim 10, wherein:
  the first sensor is provided by a second device in communication with the device; and
  receiving the notification further comprises: receiving the notification of the fulfilled condition from the second device.

18. The method of claim 10, wherein:
  the device is in communication with a second device; and
  the instructions are further configured to, upon receiving from the second device a request to register a condition test with a sensor of the device:
    register the condition test with the sensor; and
    upon receiving from the sensor a notification of a fulfilled condition test, notify the second device of the fulfilled condition test.

19. The method of claim 10, further comprising, based upon determining that the second sensor is not capable of accepting a registration for the at least one condition test, polling the second sensor to determine whether the at least one condition test is fulfilled.

20. The method of claim 10, wherein the device receives a rule set comprising one or more rules relating to tasks for a plurality of applications on the device, wherein a service of the device monitors fulfillment of conditions respectively associated with the one or more rules, and wherein the service does not require the plurality of applications to be executing during the monitoring.

21. The method of claim 10, wherein requesting from the rule server an alternative condition test that is determinable by the first sensor comprises determining operational capabilities of the device, and selecting the alternative condition test based on the determined operational capabilities of the device.

* * * * *